(12) United States Patent
Oh et al.

(10) Patent No.: US 12,030,118 B2
(45) Date of Patent: Jul. 9, 2024

(54) PLASMON HIERARCHICAL STRUCTURE HAVING NANOGAP AND MANUFACTURING METHOD THEREFOR

(71) Applicant: JEN-LIFE, Busan (KR)

(72) Inventors: Jin-Woo Oh, Busan (KR); Jong Min Lee, Chuncheon-si (KR); Wongeun Kim, Busan (KR)

(73) Assignee: JEN-LIFE, Busan (KR)

( * ) Notice: Subject to any disclaimer, the term of this patent is extended or adjusted under 35 U.S.C. 154(b) by 236 days.

(21) Appl. No.: 17/635,825

(22) PCT Filed: Dec. 17, 2020

(86) PCT No.: PCT/KR2020/018597
§ 371 (c)(1),
(2) Date: Feb. 16, 2022

(87) PCT Pub. No.: WO2021/125853
PCT Pub. Date: Jun. 24, 2021

(65) Prior Publication Data
US 2022/0317042 A1 Oct. 6, 2022

(30) Foreign Application Priority Data
Dec. 17, 2019 (KR) .......................... 10-2019-0168555

(51) Int. Cl.
*B22F 10/20* (2021.01)
*B22F 1/00* (2022.01)
(Continued)

(52) U.S. Cl.
CPC ................ *B22F 10/20* (2021.01); *B22F 1/00* (2013.01); *B22F 1/054* (2022.01); *B22F 1/0545* (2022.01);
(Continued)

(58) Field of Classification Search
CPC .. B22F 10/20; B22F 1/00; B22F 1/054; B22F 1/0545; B22F 12/58; B22F 2302/256;
(Continued)

(56) References Cited

U.S. PATENT DOCUMENTS

| 6,198,721 B1 | 3/2001 | Mueller |
| 6,400,476 B1 | 6/2002 | Arecco |

(Continued)

FOREIGN PATENT DOCUMENTS

| EP | 1 456 981 | 9/2004 |
| EP | 1 505 753 A2 | 2/2005 |

(Continued)

OTHER PUBLICATIONS

International Search Report for PCT/KR2020/018597 mailed Mar. 22, 2021 from Korean Intellectual Property Office.
(Continued)

*Primary Examiner* — Md M Rahman
(74) *Attorney, Agent, or Firm* — Paratus Law Group, PLLC (57) ABSTRACT

A plasmonic hierarchical structure according to an embodiment includes a nanogap formed between metal nanoparticles. The nanogap has a width of 1 nm to 100 nm. The metal nanoparticles comprise at least one selected from the group consisting of gold (Au), silver (Ag), copper (Cu), platinum (Pt), and palladium (Pd). The plasmonic hierarchical structure further includes silica ($SiO_2$) nanoparticles or CdSe quantum dots. A method for producing a plasmonic hierarchical structure according to an embodiment includes: injecting a metal nanoparticle solution into a micropipette; releasing the metal nanoparticle solution by bringing the micropipette into contact with a substrate; and forming a meniscus of the released metal nanoparticle solution, thereby producing a plasmonic hierarchical structure.

8 Claims, 8 Drawing Sheets

(51) Int. Cl.
  *B22F 1/054* (2022.01)
  *B22F 1/0545* (2022.01)
  *B22F 12/58* (2021.01)
  *B33Y 10/00* (2015.01)
  *B33Y 70/10* (2020.01)
  *B33Y 80/00* (2015.01)
  *G01N 21/552* (2014.01)

(52) U.S. Cl.
  CPC .............. *B22F 12/58* (2021.01); *B33Y 10/00* (2014.12); *B33Y 70/10* (2020.01); *B33Y 80/00* (2014.12); *G01N 21/553* (2013.01); *B22F 2302/256* (2013.01)

(58) Field of Classification Search
  CPC ......... B33Y 10/00; B33Y 70/10; B33Y 80/00; B33Y 70/00; G01N 21/553; G01N 21/554; B82Y 40/00; B82B 3/00; B82B 1/00
  USPC .......................................................... 356/445
  See application file for complete search history.

(56) References Cited

U.S. PATENT DOCUMENTS

2009/0225310 A1* 9/2009 Yang .................... G01N 21/658
                                                            977/700
2014/0342254 A1* 11/2014 Jennings ............. C01B 13/0207
                                                            977/773
2018/0229262 A1   8/2018 Asbahi et al.

FOREIGN PATENT DOCUMENTS

| EP | 3864196 A1 * | 8/2021 | .............. B22F 10/10 |
| JP | 5679460 B2 * | 3/2015 | ......... H01L 51/5048 |
| KR | 10-2016-0038205 A | 4/2016 | |
| KR | 20180121054 A * | 4/2017 | |
| KR | 10-2019-0070148 A | 6/2019 | |
| KR | 10-2019-0102914 A | 9/2019 | |
| WO | WO 01/45311 A1 | 6/2001 | |
| WO | WO 03/052978 A1 | 6/2003 | |
| WO | WO-2016052987 A1 * | 4/2016 | ............... G02B 6/12 |

OTHER PUBLICATIONS

Extended European Search Report for related EP application No. 21190513.8 mailed Jan. 21, 2022 from European Patent Office.
Yashna Sharma et al., "Nanoline-gap controlled self assembly of plasmonic nanoparticles inside plasmonic nanolines", Journal of Physics Communications, Nov. 19, 2019, pp. 1-12, vol. 3, vol. 11.
Mojun Chen et al., "Meniscus-on-Demand Parallel 3D Nanoprinting", ACS NANO, Apr. 19, 2018, pp. 4172-4177.

* cited by examiner

PLASMON HIERARCHICAL STRUCTURE HAVING NANOGAP AND MANUFACTURING METHOD THEREFOR

CROSS-REFERENCE TO PRIOR APPLICATIONS

This application is a National Stage Patent Application of PCT International Patent Application No. PCT/KR2020/018597 (filed on Dec. 17, 2020) under 35 U.S.C. § 371, which claims priority to Korean Patent Application No. 10-2019-0168555 (filed on Dec. 17, 2019), which are all hereby incorporated by reference in their entirety.

BACKGROUND

The present invention relates to a plasmonic hierarchical structure having a nanogap formed therein and a method for producing the same, and more particularly, to a plasmonic hierarchical structure having a nanogap formed therein, which may be easily produced using 3D printing technology, has a nanogap formed between metal nanoparticles having excellent plasmonic properties so that a gap mode resonance may be formed in the plasmonic hierarchical structure, and is applicable to an electronic device, a chemical sensor, an optical switch, or a waveguide, and a method for producing the same.

The unique optical properties of metals are at the core of many areas of research and applications, including plasmonics, metamaterials, superlensing and subdiffraction focusing, optical antennas and surface enhanced Raman scattering. One important length scale inherent in metamaterials and plasmonics research activities in the microwave, terahertz, infrared, visible and ultraviolet ranges is the gap width of metal, which is called a nanogap.

The term "nanogap" generally refers to a gap having a width ranging from several nanometers to several tens or hundreds of nanometers as known in the art, even though the size thereof is not limited to a specific range. In general, the nanogap is applicable to an electrode or a sensor. In particular, the nanogap is essential in order to measure changes in electrical properties at the molecular level.

However, since complex process steps should be performed to form this nanogap, practical difficulties exist in using the nanogap directly in industrial applications.

Therefore, the present inventors have made efforts to overcome the above-described problems, and as a result, have recognized that it is urgent to develop a plasmonic hierarchical structure having nanogap formed therein, which may be easily produced using 3D printing technology, and a method for producing the same, thereby completing the present invention.

SUMMARY

An object of the present invention is to provide a plasmonic hierarchical structure which shows little difference in the surface charge distribution because even when a defect occurs in the structure, it is recognized that virtual metal nanoparticles exist at the location of the defect due to a metal nanoparticle cluster forming the structure, and which may have a similar charge distribution even in dipole mode coupling.

Another object of the present invention is provide a method for producing a plasmonic hierarchical structure, which may produce a metal nanoparticle hierarchical structure having a nanogap formed therein while having a high aspect ratio, unlike conventional production methods based on lithography or self-assembly, and may produce a heterogeneous nanoparticle hierarchical structure having various optical properties by mixing metal nanoparticles with silica ($SiO_2$) nanoparticles or CdSe quantum dots.

Objects of the present invention are not limited to the above-mentioned objects, and other objects not mentioned herein may be clearly understood by those of ordinary skill in the art from the following description of the invention.

To achieve the above objects, the present invention provides a plasmonic hierarchical structure having a nanogap formed therein, and a method for producing the same.

Hereinafter, the present specification will be described in more detail.

The present invention provides a plasmonic hierarchical structure having a nanogap formed between metal nanoparticles.

In the present invention, the nanogap may have a width of 1 nm to 100 nm.

In the present invention, the metal nanoparticles may comprise at least one selected from the group consisting of gold (Au), silver (Ag), copper (Cu), platinum (Pt), and palladium (Pd).

In the present invention, the plasmonic hierarchical structure may further comprise silica ($SiO_2$) nanoparticles or CdSe quantum dots.

The present invention also provides a method for producing a plasmonic hierarchical structure comprising steps of:
(S1) injecting a metal nanoparticle solution into a micropipette;
(S2) releasing the metal nanoparticle solution by bringing the micropipette into contact with a substrate; and
(S3) forming a meniscus of the released metal nanoparticle solution, thereby producing a plasmonic hierarchical structure.

In the present invention, the metal nanoparticles may comprise at least one selected from the group consisting of gold (Au), silver (Ag), copper (Cu), platinum (Pt), and palladium (Pd).

In the present invention, step (S1) may comprise mixing a silica ($SiO_2$) nanoparticle or CdSe quantum dot solution with the metal nanoparticle solution and injecting the mixture into the micropipette.

In the present invention, step (S2) may comprise steps of:
(S2a) bringing the micropipette into contact with the substrate; and
(S2b) releasing the metal nanoparticle solution from the contact point between the micropipette and the substrate.

In the present invention, step (S3) may comprise steps of:
(S3a) forming the meniscus by the surface tension of the released metal nanoparticle solution; and
(S2b) depositing a plasmonic hierarchical structure on the substrate by evaporation of the metal nanoparticle solution present on the surface of the meniscus.

In the present invention, the meniscus may be formed to have a volume of 10 to 500 fL.

All details mentioned in the plasmonic hierarchical structure and the production method therefor are equally applied unless they are contradictory.

The plasmonic hierarchical structure of the present invention shows little difference in the surface charge distribution because even when a defect occurs in the structure, it is recognized that virtual metal nanoparticles exist at the location of the defect due to a metal nanoparticle cluster forming the structure, and may have a similar charge distribution even in dipole mode coupling.

In addition, in the plasmonic hierarchical structure of the present invention, the metal nanoparticles may collectively exhibit a nanogap effect, and thus a gap plasmon mode may be formed, and a metal nanoparticle mode may be suppressed, and even when the nanogap is 30 nm or more, the localized plasmon resonance wavelength may appear at a long wavelength (about 780 nm or more).

In addition, in the plasmonic hierarchical structure of the present invention, when quantum dots are added to the plasmonic hierarchical structure and weak light (402 nm wavelength and 2 kW/cm$^2$) is incident on the structure, the quantum dots may be heated, the emission wavelength may be shifted to a longer wavelength, and a strong plasmonic effect may appear in the plasmonic hierarchical structure.

In the method for producing a plasmonic hierarchical structure according to the present invention, it is possible to produce a metal nanoparticle hierarchical structure having a nanogap formed therein while having a high aspect ratio, unlike a conventional production method based on lithography or self-assembly.

In addition, in the method for producing a plasmonic hierarchical structure according to the present invention, it is possible to produce a heterogeneous nanoparticle hierarchical structure by mixing metal nanoparticles with silica ($SiO_2$) nanoparticles, thereby controlling the width of the formed nanogap.

In addition, in the method for producing a plasmonic hierarchical structure according to the present invention, it is possible to produce a heterogeneous nanoparticle hierarchical structure by mixing metal nanoparticles with CdSe quantum dots, whereby the plasmonic effect of the plasmonic hierarchical structure may be imparted to the quantum dots, thereby improving the optical properties of the structure.

Effects of the present invention are not limited to the above-mentioned effects, and other effects not mentioned herein will be clearly understood by those skilled in the art from the following description and the appended claims.

DETAILED DESCRIPTION

The terms used in the present specification are currently widely used general terms selected in consideration of their functions in the present invention, but they may change depending on the intents of those skilled in the art, precedents, or the advents of new technology. Additionally, in certain cases, there may be terms arbitrarily selected by the applicant, and in this case, their meanings are described in a corresponding description part of the invention. Accordingly, the terms used in the present invention should be defined based on the meaning of the term and the entire contents of the present invention, rather than the simple term name.

Unless otherwise defined, all terms used herein, including technical and scientific terms, have the same meaning as commonly understood by one of ordinary skill in the art to which the present invention pertains. The terms used in general and defined in dictionaries should be interpreted as having meanings identical to those specified in the context of related technology. Unless definitely defined in the present application, the terms should not be interpreted as having ideal or excessively formative meanings.

A numerical range includes numerical values defined in the range. Every maximum numerical limitation given throughout the present specification includes every lower numerical limitation, as if such lower numerical limitations were expressly written herein. Every minimum numerical limitation given throughout the present specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Hereinafter, embodiments of the present invention will be described in detail, but it is obvious that the present invention is not limited by the following embodiments.

Plasmonic Hierarchical Structure Having Nanogap Formed Therein

The present invention provides a plasmonic hierarchical structure having a nanogap formed between metal nanoparticles.

As used herein, the term "nanogap" refers to a gap having a width ranging from several nanometers to several tens or hundreds of nanometers as known in the art, even though the size thereof is not limited to a specific range.

As used herein, the term "plasmon" means a type of quasiparticle consisting of free electrons collectively vibrating within the metal, and refers to waves of electrons.

Figure 1:
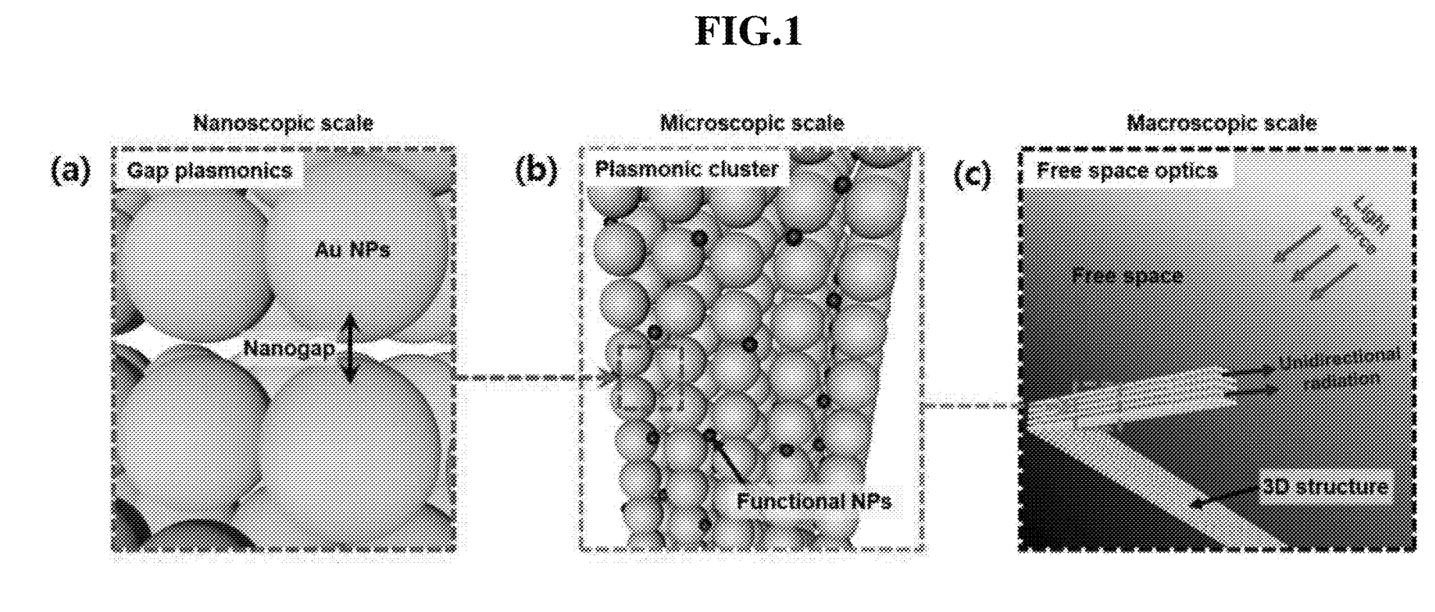
FIG. 1 schematically shows (a) a plasmonic hierarchical structure according to the present invention at a nanoscopic scale, (b) a microscopic scale, and (c) a macroscopic scale.

FIG. 1 schematically shows a plasmonic hierarchical structure according to the present invention at a nanoscopic scale (a), a microscopic scale (b) and a macroscopic scale (c).

Referring to FIG. 1, the plasmonic hierarchical structure according to the present invention may be formed in the form of a metal nanoparticle cluster having a plurality of nanogaps formed therein. Since the plasmonic hierarchical structure is formed in the form of the metal nanoparticle cluster, even when a defect occurs in the plasmonic hierarchical structure, the plasmonic hierarchical structure may maintain the same or similar optical properties as before the occurrence of the defect, and may also exhibit fine optical characteristics like a quantum emitter.

The plasmonic hierarchical structure may be in the form of a free-standing structure having a large aspect ratio. The free-standing structure is a structure which dose not an additional support for supporting the structure and in which a three-dimensional structure is formed in a vertical direction.

The metal nanoparticles may be nanoparticles comprising at least one selected from the group consisting of gold (Au), silver (Ag), copper (Cu), platinum (Pt) and palladium (Pd). Preferably, the metal nanoparticles may be nanoparticles comprising at least one selected from the group consisting of gold and silver. Most preferably, the metal nanoparticles may be gold nanoparticles.

When the surfaces of the metal nanoparticles having a size smaller than the wavelength of light are irradiated with light, a surface plasmon, which is a phenomenon of collective vibration of electrons caused by the interaction of light and electrons, may be formed at the boundary between the surface of the metal nanoparticle and a dielectric. Due to the surface plasmon formed on the metal nanoparticles, an electric field on the surfaces of the metal nanoparticles increases, and localized surface plasmon resonance (LSPR) characteristics appear.

The plasmonic hierarchical structure may have a width of 100 nm to 10 μm, preferably 100 nm to 2 μm, most preferably 500 nm to 1 μm.

The nanogap included in the plasmonic hierarchical structure may have a width of 1 nm to 100 nm, preferably 1 nm to 50 nm, most preferably 5 nm to 30 nm.

Even when the nanogap formed in the plasmonic hierarchical structure according to the present invention is 30 nm or more, the localized plasmon resonance wavelength may appear at a long wavelength (about 780 nm or more).

The nanogap may form a gap mode resonance that occurs when the gap between the metal nanoparticles decreases to a nanometer (nm) scale. The gap mode resonance may maximize electric field amplification in the wavelength range in which the gap mode resonance occurs. Thus, the plasmonic hierarchical structure may be used as a plasmonic device in the above-described wavelength range. In addition, since the wavelength range in which the gap mode resonance occurs may be changed in response to an external environment, the plasmonic hierarchical structure itself may be applied as a sensor.

In addition, since the metal nanoparticles collectively exhibit the nanogap effect, a gap plasmon mode may be formed, and the metal nanoparticle mode may be suppressed.

The plasmonic hierarchical structure may be formed as a heterogeneous nanoparticle hierarchical structure by additionally comprising silica ($SiO_2$) nanoparticles or CdSe quantum dots in addition to the metal nanoparticles.

In the case of the heterogeneous nanoparticle hierarchical structure which is a plasmonic hierarchical structure comprising the metal nanoparticles and the silica nanoparticles, it is possible to control the width of the nanogap existing in the structure. More specifically, the heterogeneous nanoparticle hierarchical structure, which is a plasmonic hierarchical structure formed by mixing the metal nanoparticles with the silica nanoparticles, has a relatively increased nanogap width compared to the nanogap width of the plasmonic hierarchical structure comprising only the metal nanoparticles, and thus may be shifted to a relatively short wavelength (shifted to blue). In general, since the optical properties of the nanogap are maximized in the wavelength range in which the gap plasmon resonance occurs, it is very important to control the wavelength range in which the gap plasmon resonance occurs. In other words, the heterogeneous nanoparticle hierarchical structure, which is a plasmonic hierarchical structure comprising the metal nanoparticles mixed with the silica nanoparticles, may be very favorable for the fabrication of applied devices, because it indicates that it is possible to control the wavelength range in which the gap plasmon resonance occurs.

In addition, in the case of the heterogeneous nanoparticle hierarchical structure which is a plasmonic hierarchical structure comprising the metal nanoparticles and CdSe quantum dots, the width of the band gap of the quantum dot decreases with increasing temperature, and thus the photoluminescence spectrum of the plasmonic hierarchical structure comprising the metal nanoparticles and the CdSe quantum dots may be shifted to a longer wavelength (shifted to red).

The plasmonic hierarchical structure of the present invention shows little difference in the surface charge distribution because even when a defect occurs in the structure, it is recognized that virtual metal nanoparticles exist at the location of the defect due to a metal nanoparticle cluster forming the structure, and may have a similar charge distribution even in dipole mode coupling.

Method for Producing Plasmonic Hierarchical Structure present invention also provides a method for producing a plasmonic hierarchical structure comprising steps of:
(S1) injecting a metal nanoparticle solution into a micropipette;
(S2) releasing the metal nanoparticle solution by bringing the micropipette into contact with a substrate; and
(S3) forming a meniscus of the released metal nanoparticle solution, thereby producing a plasmonic hierarchical structure.

The plasmonic hierarchical structure is the same as mentioned above.

The method for producing a plasmonic hierarchical structure may be performed through 3D printing, more specifically, a meniscus-guided 3D printing technique.

Step (S1) may be a step of injecting a metal nanoparticle solution into a micropipette. More specifically, step (S1) may be a step of injecting a metal nanoparticle solvent into a micropipette having a nozzle formed therein.

The metal nanoparticles may be nanoparticles comprising at least one selected from the group consisting of gold (Au), silver (Ag), copper (Cu), platinum (Pt) and palladium (Pd). Preferably, the metal nanoparticles may be nanoparticles comprising at least one selected from the group consisting of gold and silver. Most preferably, the metal nanoparticles may be gold nanoparticles.

The micropipette may be a glass capillary puller having a nozzle. When the glass capillary puller is used, it is possible to control the injection rate of the metal nanoparticle solution.

The micropipette may have a diameter of 1 to 5 μm, preferably 2 to 4 μm.

In step (S1), a silica ($SiO_2$) nanoparticle or CdSe quantum dot solution may be mixed with the metal nanoparticle solution and injected into the micropipette, thereby producing a heterogeneous nanoparticle hierarchical structure as a plasmonic hierarchical structure.

Step (S2) may comprise steps of:
(S2a) bringing the micropipette into contact with the substrate; and
(S2b) releasing the metal nanoparticle solution from the contact point between the micropipette and the substrate.

More specifically, as the micropipette comes into contact with the substrate and the micropipette moves from the contact point in a specific direction, for example, a vertical direction, at a predetermined speed, a predetermined flow rate of the metal nanoparticle solution may be released from the nozzle at the tip of the micropipette.

Step (S3) may comprise steps of:
(S3a) forming the meniscus by the surface tension of the released metal nanoparticle solution; and
(S2b) depositing a plasmonic hierarchical structure on the substrate by evaporation of the metal nanoparticle solution present on the surface of the meniscus.

More specifically, the meniscus may be formed by the surface tension of the metal nanoparticle solution released from the vicinity of the nozzle at the tip of the micropipette. A plasmonic hierarchical structure may be deposited on the substrate by evaporation of a solvent present in the metal nanoparticle solution from the meniscus surface. While the micropipette is moved upward, the surface tension of the meniscus formed at the tip of the nozzle may act to minimize the surface area of the metal nanoparticle solution, and may pull the metal nanoparticle solution in the nozzle so that the metal nanoparticle solution may be released of the nozzle without interruption, thereby depositing a plasmonic hierarchical structure on the substrate.

As the nozzle at the tip of the micropipette is moved in any direction, a plasmonic hierarchical structure corresponding to the movement trajectory may be produced.

The meniscus may be formed to have a volume of 10 to 500 fL.

According to the method for producing a plasmonic hierarchical structure according to the present invention, it is possible to produce a metal nanoparticle hierarchical structure having a nanogap formed therein while having a high aspect ratio, unlike conventional production methods based on lithography or self-assembly, and it is possible to produce a heterogeneous nanoparticle hierarchical structure having various optical properties by mixing metal nanoparticles with silica ($SiO_2$) nanoparticles or CdSe quantum dots.

The advantages and features of the present invention, and the way of attaining them, will become apparent with reference to the examples described in detail below. However, the present invention is not limited to the examples disclosed below and may be embodied in a variety of different forms; rather, these examples are provided so that this disclosure of the present invention will be thorough and complete, and will fully convey the scope of the present invention to those skilled in the art. The scope of the present invention will be defined by the appended claims.

Example 1. Production of Plasmonic Hierarchical Structure 1 Having Nanogap Formed Between Metal Nanoparticles A solution containing gold nanoparticles (NanoXact Gold Nanospheres—Polystyrene—100 nm, Nanocomposix, San Diego, CA 92111, USA) at a concentration of 1 mg/ml was injected into a micropipette having a diameter of 3 μm. Next, the micropipette was brought into contact with a substrate, and the metal nanoparticle solution was released from the contact point between the micropipette and the substrate. A femtoliter-scale meniscus was formed by the surface tension of the released metal nanoparticle solution, and a plasmonic hierarchical structure was deposited on the substrate by evaporation of the metal nanoparticle solution present on the meniscus surface, thereby producing plasmonic hierarchical structure 1 having a curved shape.

Example 2. Production of Plasmonic Hierarchical Structure 2 Having Nanogap Formed Between Metal Nanoparticles A solution containing gold nanoparticles (NanoXact Gold Nanospheres—Polystyrene—100 nm, Nanocomposix, San Diego, CA 92111, USA) at a concentration of 1 mg/ml was injected into a micropipette having a diameter of 3 μm. Next, the micropipette was brought into contact with a substrate, and the metal nanoparticle solution was released from the contact point between the micropipette and the substrate. A femtoliter-scale meniscus was formed by the surface tension of the released metal nanoparticle solution, and a plasmonic hierarchical structure was deposited on the substrate by evaporation of the metal nanoparticle solution present on the meniscus surface, thereby producing plasmonic hierarchical structure 2 having a simple columnar shape.

Example 3. Production of Plasmonic Hierarchical Structure 3 Having Nanogap Formed Between Metal Nanoparticles+Silica Nanoparticles A solution containing gold nanoparticles (NanoXact Gold Nanospheres—Polystyrene—100 nm, Nanocomposix, San Diego, CA 92111, USA) at a concentration of 1 mg/ml was mixed with 20 nm silica nanoparticles (Nanocs Inc., New York, NY 10001, USA), and the mixture and toluene were placed and mixed in a centrifuge. At this time, the gold nanoparticles and silica nanoparticles were mixed together at concentration ratios of 100:0, 100:5 and 100:10. Each of the three mixtures of the gold nanoparticles and the silica nanoparticles was injected into a micropipette having a diameter of 3 μm. Next, each of the micropipettes was brought into contact with a substrate, and each of the metal nanoparticle solutions was released from the contact point between each micropipette and each substrate. A meniscus was formed by the surface tension of each of the released metal nanoparticle solutions, and the metal nanoparticle solution existing on each of the meniscus surfaces was evaporated and a plasmonic hierarchical structure was deposited on each of the substrates, thereby producing plasmonic hierarchical structures 3A, 3B and 3C.

|  | Mixing volume ratio between gold nanoparticles and silica nanoparticles | | |
| --- | --- | --- | --- |
|  | Plasmonic hierarchical structure 3A | Plasmonic hierarchical structure 3B | Plasmonic hierarchical structure 3C |
| Gold nanoparticles | 100 | 100 | 100 |
| Silica nanoparticles | 0 | 5 | 10 |

Example 4. Production of Plasmonic Hierarchical Structure 4 Having Nanogap Formed Between Metal Nanoparticles+CdSe Quantum Dot Nanoparticles A solution containing gold nanoparticles (NanoXact Gold Nanospheres—Polystyrene—100 nm, Nanocomposix, San Diego, CA 92111, USA) at a concentration of 1 mg/ml was mixed with colloidal CdSe quantum dots having an emission peak at 620 nm and a concentration of 5 mg/ml. The mixture was injected into a micropipette having a diameter of 3 μm. Next, the micropipette was brought into contact with a substrate, and the metal nanoparticle solution was released from the contact point between the micropipette and the substrate. A meniscus was formed by the surface tension of the released metal nanoparticle solution, and a plasmonic hierarchical structure was deposited on the substrate by evaporation of the metal nanoparticle solution present on the meniscus surface, thereby producing plasmonic hierarchical construct 4.

Experimental Example 1. Confirmation of Nanogap Formation

In order to confirm whether a nanogap is present in the plasmonic hierarchical structure according to the present invention, whether or not the nanogap would be formed was examined by performing measurement with a scanning electron microscope (SEM) (Hitachi S-4700, PNU center for Research facilities, Busan, Korea) and a transmission electron microscope (TEM) for plasmonic hierarchical structure 1 produced in Example 1. The results are shown in FIG. 2.

Figure 2:
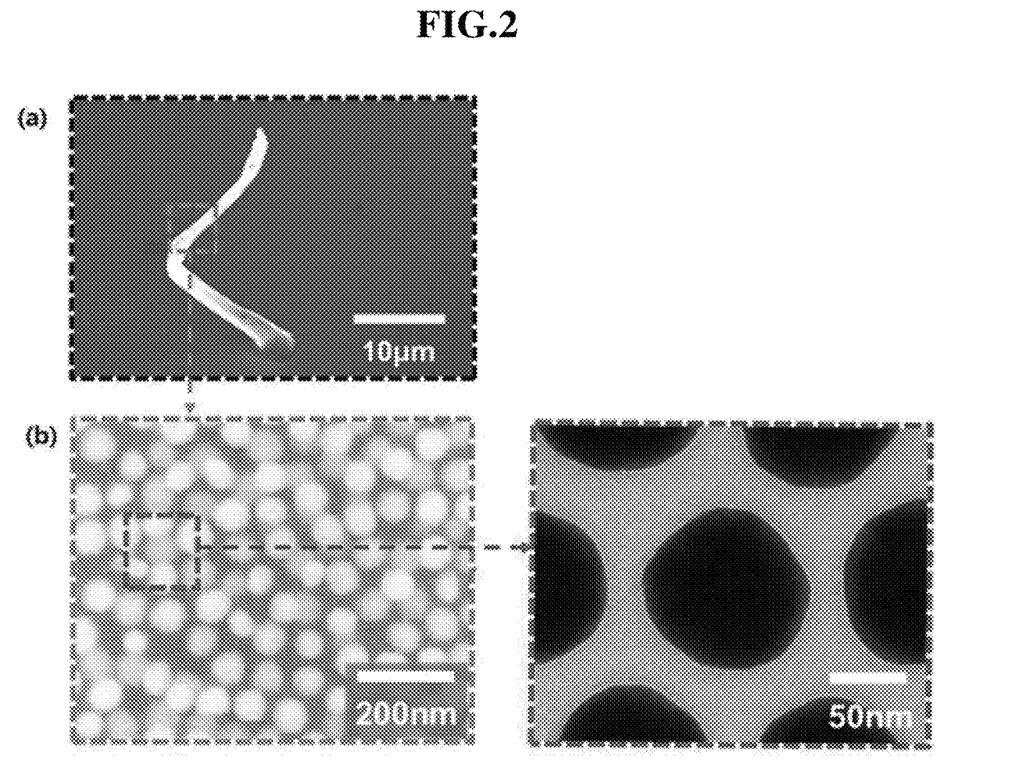
FIG. 2 depicts (a) a transmission electron microscope (TEM) image and (b) scanning electron microscope (SEM) image of plasmonic hierarchical structure 1 produced in Example 1 according to the present invention.
Figure 3:
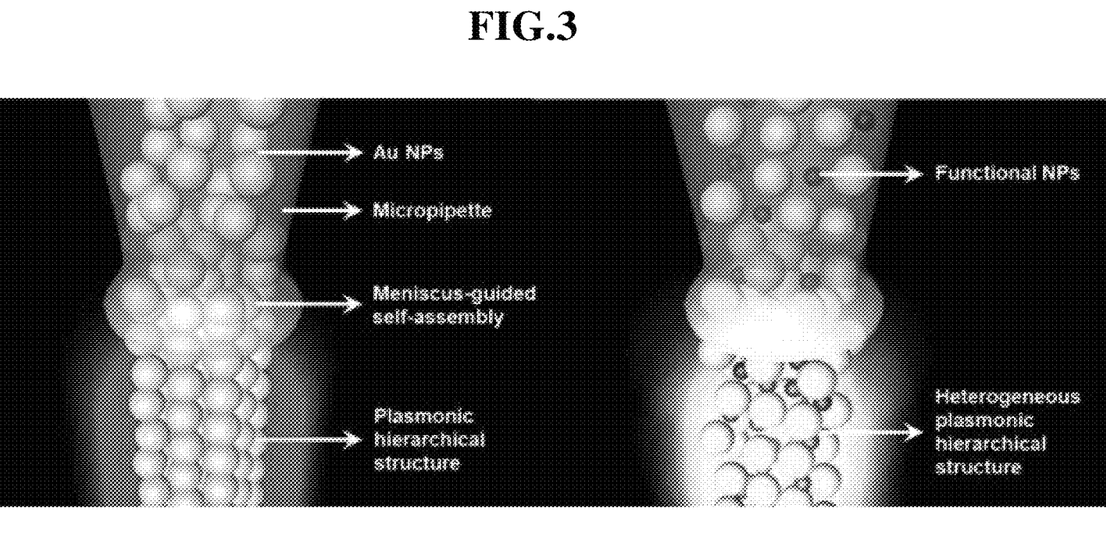
FIG. 3 is a schematic diagram showing a method for producing a plasmonic hierarchical structure according to the present invention.

Referring to FIG. 2, it can be confirmed that a nanogap was formed in the plasmonic hierarchical structure 1 produced in Example 1. From this result, it was demonstrated that a gap mode resonance phenomenon may appear in the plasmonic hierarchical structure according to the present invention.

Experimental Example 2. Confirmation of Consistency of 3D Self-Assembly Method

In order to confirm the consistency of the 3D self-assembly method for producing a plasmonic hierarchical structure according to the present invention, the plasmonic hierarchical structure 2 produced in Example 2 was divided into five points (points 1 to 5) and then subjected to focused ion beam (FIB) milling (Helios NanoLab™, FEI, Eindhoven, 55651, Netherlands) and then to dark field scattering measurement. The results are shown in FIG. 4.

Figure 4:
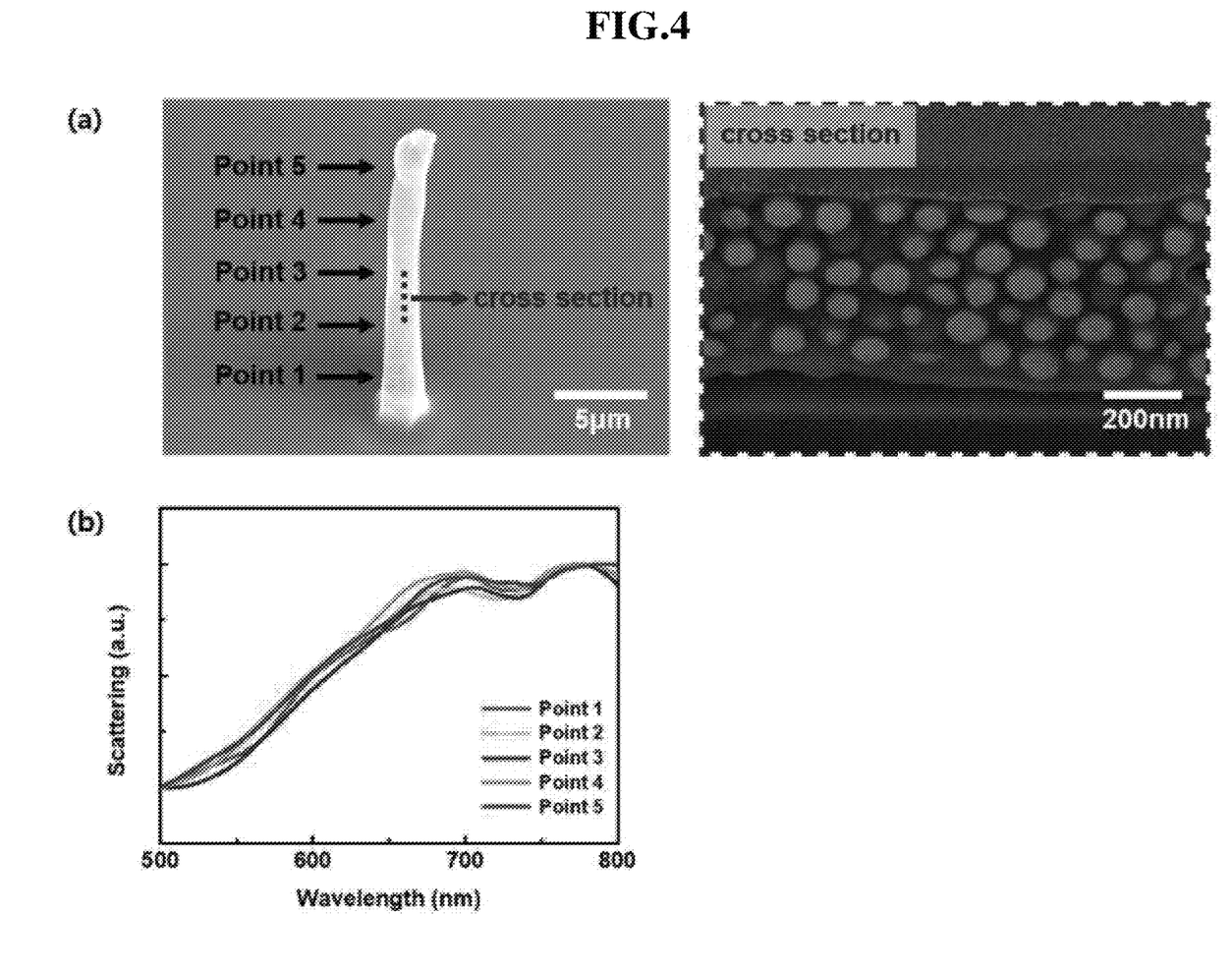
FIG. 4 depicts (a) a scanning electron microscope (SEM) image (left) and focused ion beam (FIB) milling image (right) of plasmonic hierarchical structure 2 produced in Example 2 according to the present invention, and depicts (b) a graph showing the results of performing dark-field scattering measurement of plasmonic hierarchical structure 2 after FIB milling.

Referring to FIG. 4(a), as can be seen from the scanning electron microscope (SEM) image (left of FIG. 4(a)) of points 1 to 5 of plasmonic hierarchical structure 2 subjected to focused ion beam (FIB) milling, it can be confirmed that the gold nanoparticles forming the plasmonic hierarchical structure 2 were completely self-assembled not only on the surface but also inside of the structure. Referring to FIG. 4(b), as a result of performing dark field scattering measurement of points 1 to 5 of plasmonic hierarchical structure 2 subjected to focused ion beam (FIB) milling, it was confirmed that points 1 to 5 showed almost the same gap mode resonance wavelength which was 770 nm. From the above results, it can be seen that the plasmonic hierarchical structure according to the present invention had uniform nanogaps formed therein.

Experimental Example 3. Analysis of Optical Properties

Figure 5:
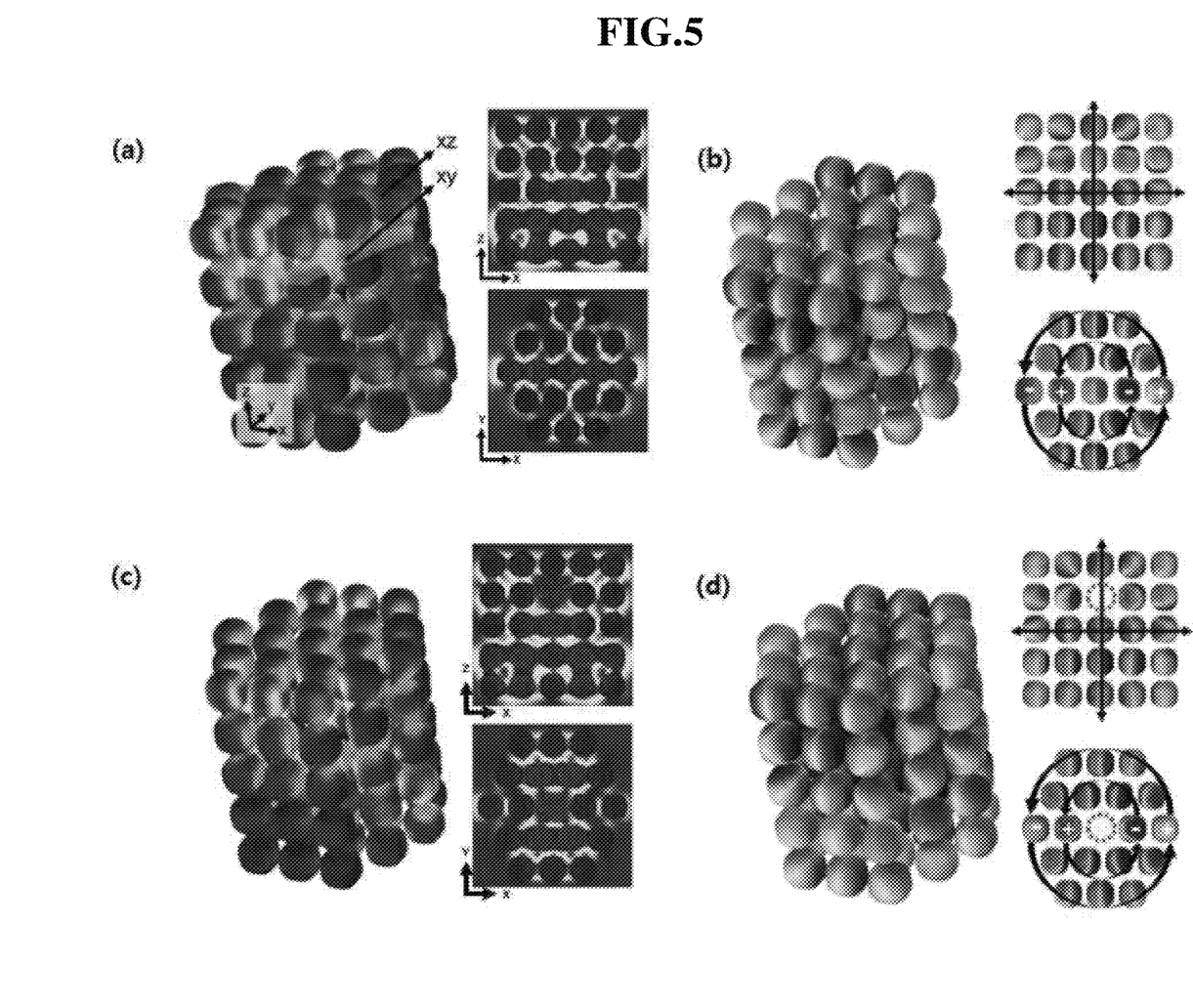
FIG. 5 shows the 3D electric field amplitude data and 3D surface charge distributions of plasmonic hierarchical structure 1 having no metal nanoparticle defect ((a) and (b)) and comparative plasmonic hierarchical structure 1 having metal nanoparticle defects ((c) and (d)).

In order to analyze the optical properties of the plasmonic hierarchical structure of the present invention depending on the presence or absence of metal nanoparticle defects, simulation using the 3D finite element method (3D FEM) with COMSOL Multiphysics was performed on plasmonic hierarchical structure 1 produced in Example 1. The results are shown in FIG. 5. For reference, in order to construct a plasmonic hierarchical structure model having defects, comparative plasmonic hierarchical structure 1 was prepared by randomly removing gold nanoparticles (red circles in FIGS. 5(c) and 5(d)) from plasmonic hierarchical structure 1.

Referring to FIGS. 5(a) and (c), it can be confirmed that, in plasmonic hierarchical structure 1 having metal nanoparticles defects (FIG. 5(a)) and comparative plasmonic hierarchical structure 1 having metal nanoparticles defects (FIG. 5(c)), the 3D electric field amplitude data for the XZ and XY cross-sections were hardly changed by the near-field interaction between the gold nanoparticles.

In addition, referring to FIGS. 5(b) and 5(d), it can be confirmed that plasmonic hierarchical structure 1 having metal nanoparticles defects (FIG. 5(b)) and comparative plasmonic hierarchical structure 1 having metal nanoparticles defects (FIG. 5(d)) had similar 3D surface charge distributions.

From the above results, it can be confirmed that optical properties of the plasmonic hierarchical structure did not change depending on the presence or absence of metal nanoparticle defects in the plasmonic hierarchical structure, suggesting that virtual metal nanoparticles are recognized to exist in the plasmonic hierarchical structure.

Experimental Example 4. Examination of Nanogap Change and Short Wavelength Shift (Shift to Blue) Depending on the Amount of Silica Nanoparticles Added In order to examines changes in nanogap control ability and short wavelength shift (shift to blue) depending on the amount of silica nanoparticles included in a heterogeneous nanoparticle hierarchical structure which is a plasmonic hierarchical structure comprising gold nanoparticles and silica nanoparticles, scattering characteristic analysis and 3D FDTD simulation were performed on the three plasmonic hierarchical structures produced in Example 3. The results are shown in FIGS. 6 and 7.

4.1 Analysis of Scattering Characteristics

Figure 6:
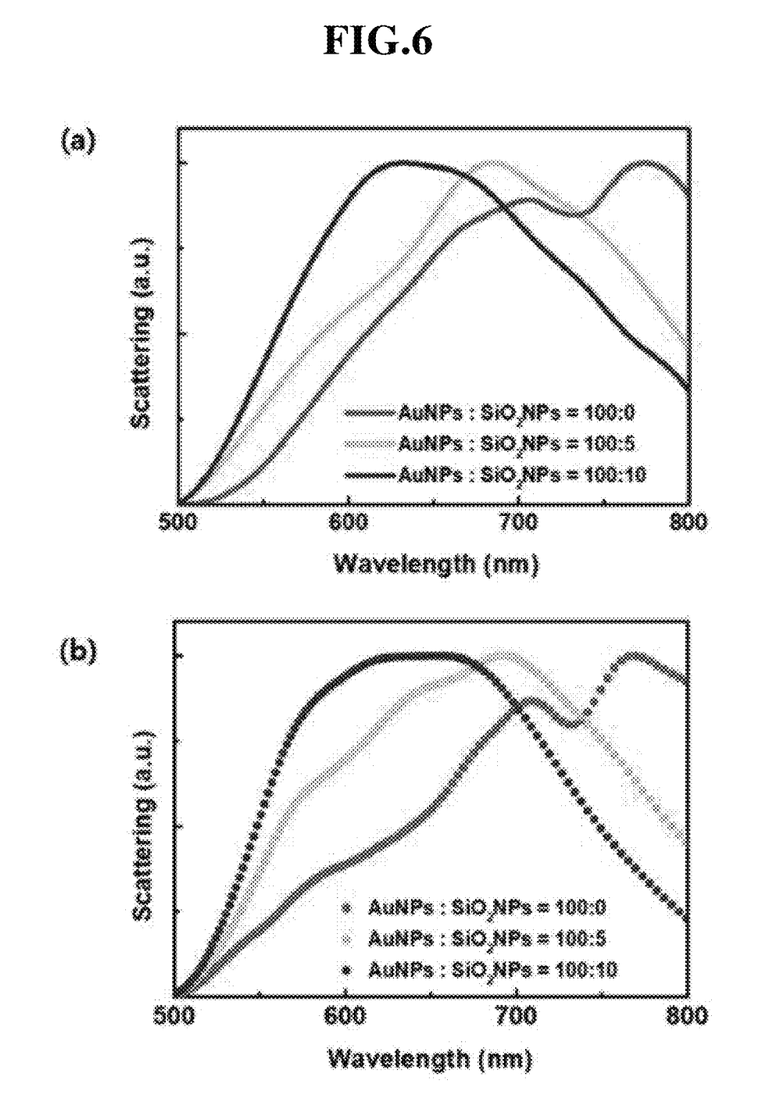
FIG. 6 depicts (a) an experimental graph showing the results of measuring the scattering characteristics of a plasmonic hierarchical structure comprising gold nanoparticles and silica nanoparticles, produced in Example 3, and (b) a graph showing the results of performing simulation.
Figure 7:
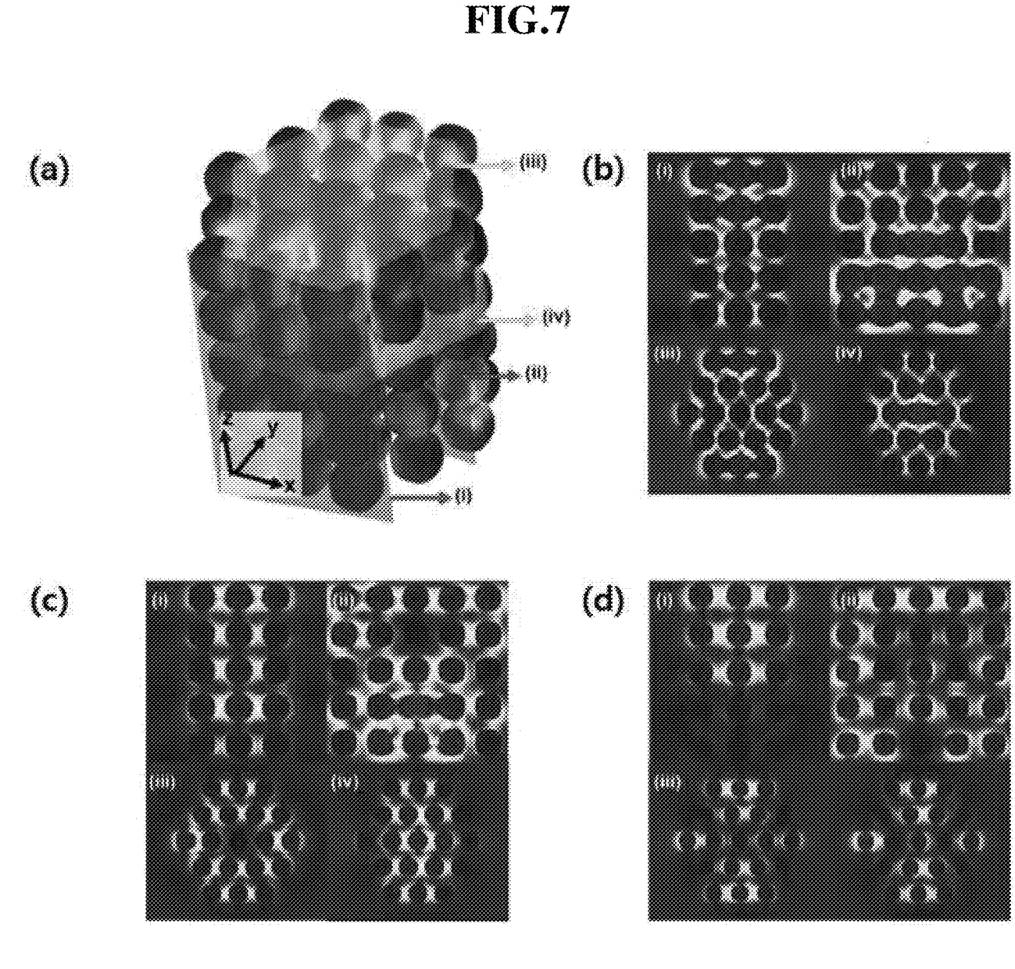
FIG. 7 depicts two-dimensional diagrams showing the electric field enhancement distribution of the plasmonic hierarchical structure comprising gold nanoparticles and silica nanoparticles, produced in Example 3.
Figure 8:
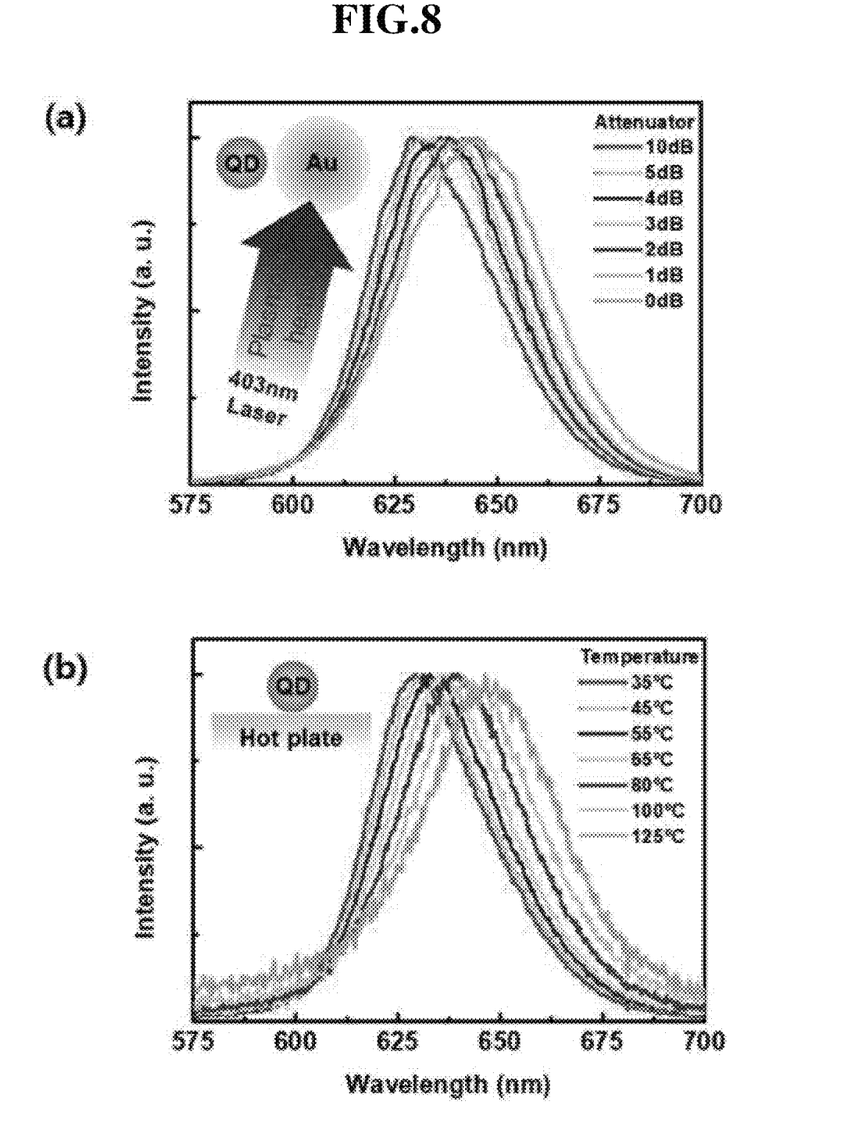
FIG. 8 depicts graphs showing the results of evaluating the effects of addition of quantum dots on photoluminescence (PL) (a) and plasmonic heating (b).

Referring to FIG. 6, it was confirmed that, in plasmonic hierarchical structure 3A comprising only gold nanoparticles, a relatively narrow nanogap was formed, and thus the gap mode resonance wavelength appeared at about 770 nm. On the other hand, it was confirmed that plasmonic hierarchical structure 3B comprising gold nanoparticles and silica nanoparticles at a volume ratio of 100:5 has an increased nanogap compared to plasmonic hierarchical structure 3A due to the silica nanoparticles, and for this reason, the gap mode resonance wavelength appeared at about 684 nm, which is a slightly shorter wavelength (shifted to blue). In addition, it was confirmed that plasmonic hierarchical structure 3C comprising gold nanoparticles and silica nanoparticles at a volume ratio of 100:10 exhibited the most increased nanogap because it included the largest amount of the silica nanoparticles, and for this reason, the gap mode resonance wavelength appeared at about 632 nm, which is a shorter wavelength (shifted to blue).

4.2 3D FDTD Simulation Results

FIGS. 7(a), 7(b) and 7(c) show 3D FDTD simulation results for plasmonic hierarchical structure 3A, plasmonic hierarchical structure 3B and plasmonic hierarchical structure 3C, respectively.

Referring to FIG. 7, it can be confirmed that, as the nanogap of the plasmonic hierarchical structure increased, that is, as the amount of silica nanoparticles included increased, near field enhancement decreased.

From the above results, it can be confirmed that, in the heterogeneous nanoparticle hierarchical structure, which is a plasmonic hierarchical structure comprising gold nanoparticles and silica nanoparticles, it is possible to control the wavelength range in which a gap plasmon resonance occurs.

Experimental Example 5. Evaluation of the Effects of Addition of Quantum Dots on Photoluminescence (PL) and Plasmonic Heating In order to evaluate the effects of addition of quantum dots on photoluminescence (PL) and plasmonic heating, weak light with a wavelength of 402 nm and a laser source power of 2 kW/cm$^2$ was applied to plasmonic layer structure 4 produced in Example 4. As a result, it could be confirmed that, as the quantum dots included in plasmon hierarchical structure 4 were heated, the emission wavelength was shifted to a longer wavelength (shifted to red). This signal is similar to a photoluminescence signal measured after heating quantum dots to 100° C. or higher, and it is known that the temperature can increase when the plasmonic concentration phenomenon occurs, suggesting that a strong plasmonic effect appeared in the plasmonic hierarchical structure.

While the present invention has been described with reference to the illustrative embodiments, those skilled in the art to which the present invention pertains will appreciate that that the present invention may be embodied in other specific forms without departing from the technical spirit or essential characteristics of the present invention. Therefore, the embodiments described above are considered to be illustrative in all respects and not restrictive.

The invention claimed is:

1. A method for producing a plasmonic hierarchical structure comprising steps of:
    (S1) injecting a mixture solution into a micropipette, wherein the step (S1) comprises mixing at least one of a silica (SiO$_2$) nanoparticle solution and CdSe quantum dot solution with a metal nanoparticle solution, thus forming the mixture solution, and injecting the mixture solution into the micropipette;
    wherein step (S1) further comprises
        mixing the silica (SiO$_2$) nanoparticles and/or the CdSe quantum dots at a controlled ratio with metal nanoparticles in the mixture solution, wherein the controlled ratio is determined based on a desired adjustment of widths of nano-gaps, thus allowing for control of a wavelength range at which gap plasmon resonance occurs;
    (S2) releasing the mixture solution by bringing the micropipette into contact with a substrate; and
    (S3) forming a meniscus of the released mixture solution, thereby producing a plasmonic hierarchical structure.

2. The method of claim 1, which is performed using a 3D meniscus-guided 3D printing technique.

3. The method of claim 1, wherein the metal nanoparticles comprise at least one selected from the group consisting of gold (Au), silver (Ag), copper (Cu), platinum (Pt), and palladium (Pd).

4. The method of claim 1, wherein step (S2) comprises steps of:
    (S2a) bringing the micropipette into contact with the substrate; and
    (S2b) releasing the mixture solution from a contact point between the micropipette and the substrate.

5. The method of claim 1, wherein step (S3) comprises steps of:
    (S3a) forming the meniscus by a surface tension of the released mixture solution; and
    (S2b) depositing a plasmonic layer structure on the substrate by evaporation of the mixture solution present on the surface of the meniscus.

6. The method of claim 1, wherein the meniscus is formed to have a volume of 10 to 500 fL.

7. The method of claim 1, wherein the controlled ratio of silica (SiO$_2$) nanoparticles and/or the CdSe quantum dots to metal nanoparticles in the mixture solution is from 5:100 to 10:100.

8. The method of claim 7, wherein nanoparticles in the mixture solution consist of metal nanoparticles and silica (SiO$_2$).

* * * * *